July 29, 1941.  V. W. KLIESRATH ET AL  2,250,835
GEAR SHIFTING MECHANISM
Original Filed Dec. 11, 1931   3 Sheets-Sheet 1

INVENTOR.
VICTOR W. KLIESRATH
ROY S. SANFORD
BY
ATTORNEY

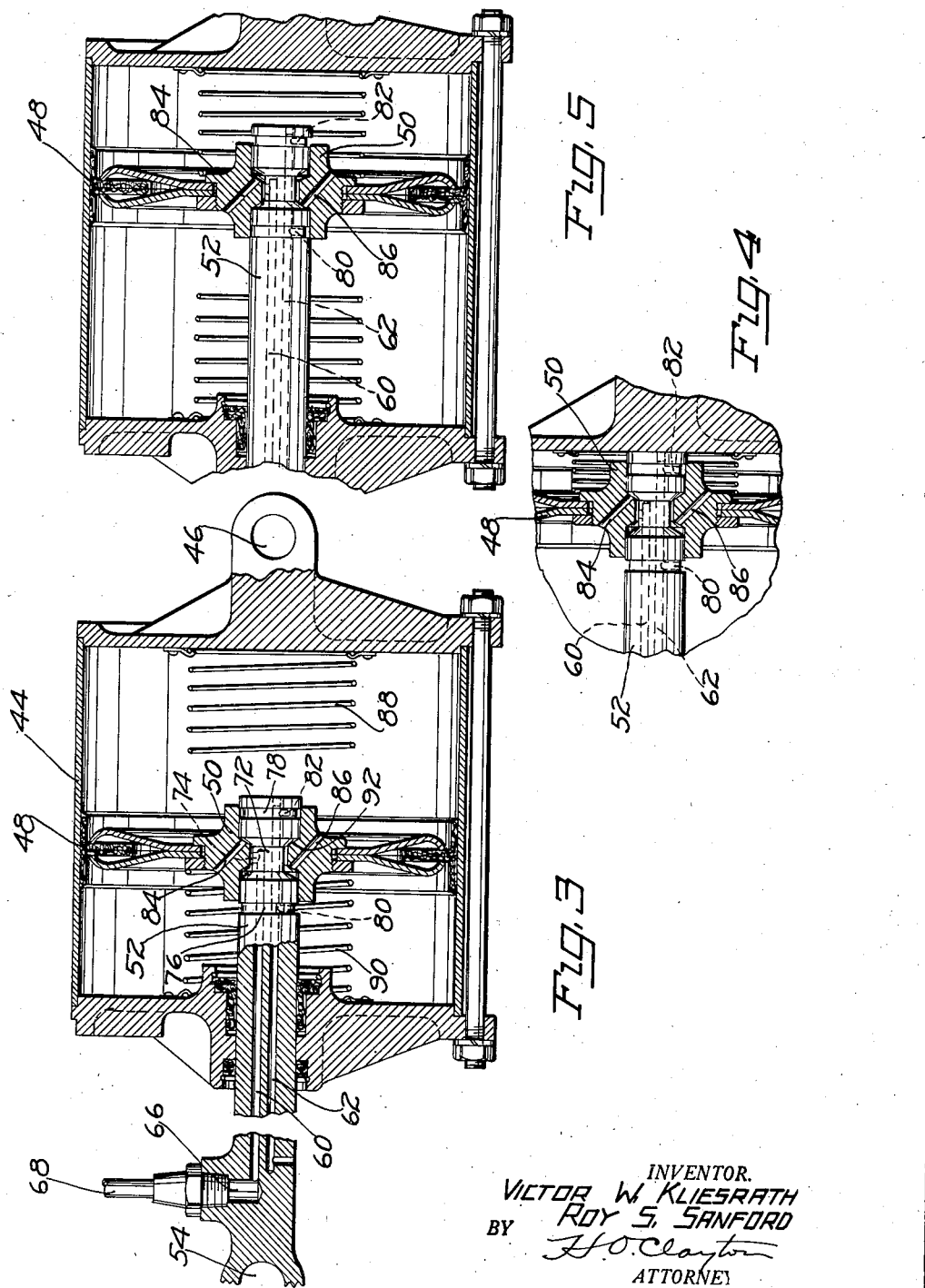

July 29, 1941.   V. W. KLIESRATH ET AL   2,250,835
GEAR SHIFTING MECHANISM
Original Filed Dec. 11, 1931    3 Sheets-Sheet 3

INVENTOR.
VICTOR W. KLIESRATH
BY ROY S. SANFORD
H.O.Clayton
ATTORNEY

Patented July 29, 1941

2,250,835

UNITED STATES PATENT OFFICE 2,250,835

GEAR SHIFTING MECHANISM

Victor W. Kliesrath, South Bend, Ind., and Roy S. Sanford, New York, N. Y., assignors to Bendix Aviation Corporation, South Bend, Ind., a corporation of Delaware Application December 11, 1931, Serial No. 580,434
Renewed January 16, 1936

20 Claims. (Cl. 192—.01)

This invention, in its broadest aspect, relates to new and useful improvements in the power plant of an automotive vehicle.

More specifically, the invention relates to gear shifting mechanism and is of particular utility when employed in connection with speed-changing and direction-reversing gearing commonly used in coupling internal-combustion engines of automobiles with the driving vehicle wheels or other propelling devices.

One object of the invention is to provide power operated means for operating a two-speed transmission mechanism, preferably mounted on the differential housing of an automotive vehicle. Such a mechanism is designed to supplement the conventional change-speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

According to one desirable construction, there is suggested a vacuum operated double-acting servo motor mechanism controlled by a manually operated three-way valve. The motor comprises a double-ended casing housing a unit comprising a piston and a relatively movable connecting rod, and which unit serves both as a selector valve to determine the mode of operation of the motor and as the force-transmitting reciprocable element of the motor.

A further object of the invention is to provide power means housed within the motor, for operating the aforementioned selector valve, and which power means is controlled by the aforementioned three-way control valve.

Yet another object of the invention is to provide a manually operable member serving as a common element in controlling the operation of the engine throttle, clutch and aforementioned supplemental transmission.

A further object of the invention is to provide, in conjunction with the conventional manually operated accelerator pedal, a manually operated valve, the pedal and valve together serving to control the throttle, a power operated means for operating the clutch and a second power operated means for operating the aforementioned supplemental transmission.

Other objects of the invention and desirable details of construction and combinations of parts will become apparent from a detailed description of certain embodiments of the invention, described in detail in the following specification taken in conjunction with the accompanying drawings illustrating said embodiments, in which.

Figure 1:
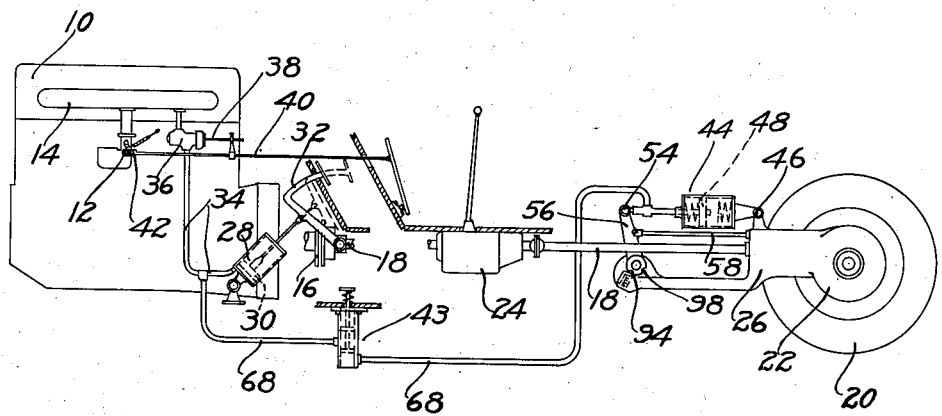
Figure 1 is a diagrammatic view disclosing the various elements of the power plant constituting the present invention.
Figure 6:
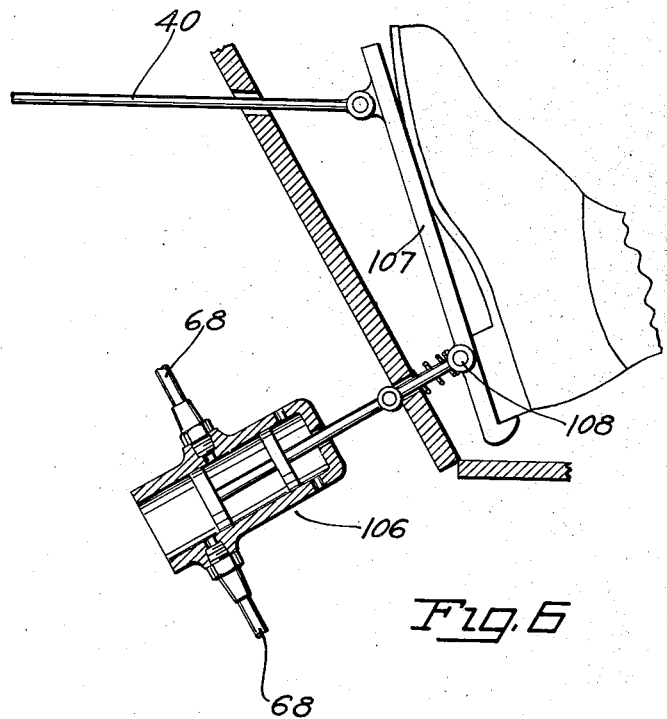
Figure 7:
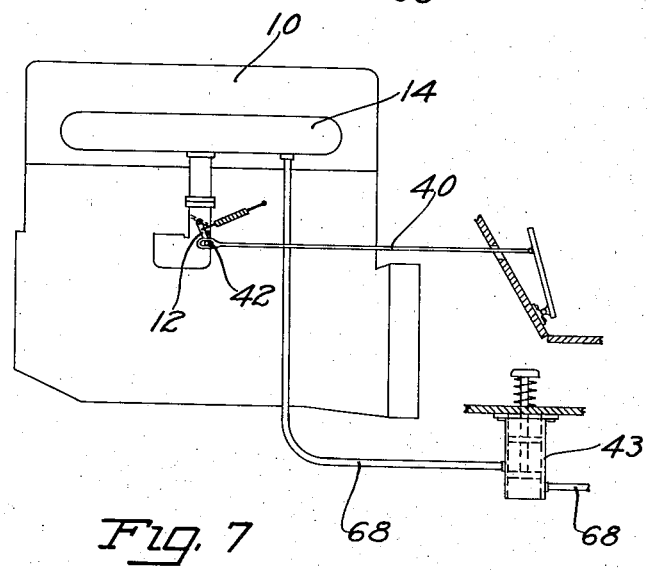

Figures 3, 4 and 5 disclose longitudinal sectional views of the aforementioned servo motor in certain of its operative positions;

Figure 6 discloses one form of accelerator pedal and control valve construction; and Figure 7 is a partial diagrammatic view disclosing an arrangement constituting a modification of the system disclosed in Figure 1.

In that embodiment of the invention selected for illustration and shown diagrammatically in Figure 1 there is provided a conventional internal-combustion engine 10 having a throttle 12 and intake manifold 14. A conventional disk clutch 16 comprising the usual driving and driven plates, or equivalent elements, serves to connect the engine with a drive shaft 18, the latter being connected to the rear or drive wheels 20 through the intermediary of a conventional differential 22. A conventional three-speeds forward and reverse transmission or equivalent change-speed mechanism 24 is incorporated in the driven mechanism, and supplementing the transmission 24, and also incorporated in the driven mechanism, there is provided a two-speed transmission mechanism 26, preferably mounted on the differential housing as disclosed diagrammatically in Figure 1.

The invention is concerned in general with the correlation of the operating means for the clutch, the operating means for the supplemental transmission, and the internal-combustion engine, and in particular with the operating means for the supplemental transmission.

Power means are provided for operating the clutch comprising a vacuum operated servo motor, the latter comprising a cylinder 28 secured to the chassis and a reciprocable piston 30 operably connected to a conventional clutch pedal 32. A fluid transmitting conduit 34 interconnects the manifold 14 with the servo motor, a three-way valve 36, described in detail in an application of Victor W. Kliesrath, No. 568,082, filed October 10, 1931, now Patent No. 2,036,053, dated March 31, 1936, being interposed in the fluid transmitting connection to control the motor in its operation of the clutch. The valve 36 is operated either before or after the throttle is opened or closed respectively by a connection 38 interconnecting the valve and throttle rod 40. A lost motion connection 42 is provided between the throttle 12 and rod 40 to effect this operation.

With the opening of the valve upon completely releasing the accelerator pedal the clutch operating motor is energized or vacuum operated in a manner well-known in the art to thereby disengage the clutch and upon closing the valve, with actuation of the accelerator pedal, the motor is deenergized and the clutch permitted to engage. At closed throttle the engine cylinders function as a pump to evacuate the manifold, producing a vacuum of approximately twenty inches of mercury.

The aforementioned structure is described only briefly, inasmuch as the same forms no part of the instant invention, being disclosed in a general way in the patent to Belcia, No. 1,470,272, dated October 9, 1923, and disclosed and claimed in greater detail in the application of Victor W. Kliesrath, No. 553, 730, filed July 29, 1931, now Patent No. 2,031,716, dated February 25, 1936.

The invention is particularly concerned with the means for operating the two-speed supplemental transmission 26 mounted on the differential housing. Such means, in brief, comprises a vacuum operated servo motor controlled by a manually operated spring loaded three-way valve 43, the latter being preferably rigidly secured to the under side of the floor board in a position to be operated by the left foot of the driver.

Describing the aforementioned motor in greater detail, the same comprises a double-ended cylinder 44 pivotally secured to the transmission 26 at 46. A piston 48 is reciprocable within the cylinder, the hub 50 of which is slidably mounted on a piston rod 52, the latter being pivotally connected at 54 to a crank arm or lever member 56 operably connected, by rod 58, to actuate the supplemental transmission 26. The relatively movable piston hub 50 and rod 52 together constitute a selector valve to determine the mode of operation of the motor, as will be described in greater detail hereinafter.

The rod 52 is provided with bores 60 and 62, the latter serving as an atmospheric vent. The bore 60 communicates, via a port 66, with a flexible air transmitting conduit 68, the latter being preferably connected at its other end to the conduit 34 intermediate the valve 36 and clutch operating motor. The aforementioned spring pressed three-way valve 43 is incorporated in the fluid circuit provided by conduit 68, a reciprocable spool-shaped piston 70 of which serves to alternately intercommunicate the bore 60 with the atmosphere or with the manifold, depending upon the position of the piston.

The rod 52 is preferably provided with a spool-shaped end member 72, the bore 60 terminating at 74 at the center of the spool and the air duct or bore 62 terminating in one of the ends of said member: grooves 76 and 78 are provided in said members and transversely extending bores or ducts 80 and 82, communicating with the bore 62, terminate in said grooves. The piston hub portion 50 is provided with angularly extending bores 84 and 86 providing air transmitting communication between the right and left compartments of the motor and the valve chamber, the latter provided by the hub of the piston and the aforementioned spool-shaped end of the rod 52. A spring member 88 is secured to one end of the motor and a like spring 90 is secured to the other end of the motor, the function of said springs as well as the aforementioned valve structure being described in detail hereinafter.

The complete cycle of operations will now be described, starting with the vehicle at rest and the engine inoperative.

Upon starting the engine with the accelerator released the vacuum induced in the manifold will at once energize the clutch operating motor to disengage the clutch, the piston 30 of the motor and its connected clutch pedal 32 moving to the positions shown in Figure 1. The control valve 36, at this time, is opened to interconnect the manifold with the clutch motor. The other control valve 43 is, at this time, closed, that is, positioned to vent the bore 60 to atmosphere, and the piston 48 is positioned intermediate the ends of the motor, as disclosed in Figure 3. In this position of the parts the right end of the spool member 72 abuts a tapered annular flange 92 extending from the inner face of the hub 50 into the aforementioned valve compartment. The left compartment of the motor is thus vented to atmosphere via duct 80 and bore 62, and the right compartment is likewise vented via valve 43, port 66, bore 60 and bore 86. The crank 56 is at this time positioned as disclosed in Figure 1 to place the transmission 26 in one of its two gear settings, preferably the higher of the two, such setting being maintained by a spring pressed ball 94 adapted to seat within detents 98 in the hub of the lever 56.

Assuming that it is now desired to start the car in motion, the transmission 26 is placed in low gear and the accelerator subsequently depressed to open the throttle. The initial movement of the accelerator pedal serves to close the valve 36, deenergizing the clutch motor and permitting the clutch to engage. Further depression of the accelerator serves to speed up the engine to effect the desired vehicle speed in low gear. Subsequent operation of the accelerator to clutch and declutch accompanied by the successive shifting into second and high gears will effect the desired speed of the vehicle in the usual manner.

Should it be desired to change the driving ratio, assuming a fixed gear setting of the conventional transmission 24, it is merely necessary to declutch by releasing the accelerator and then open the valve 43 with the toe of the left foot. The right compartment of the transmission operating motor is thus placed in communication with the manifold via bore 86, bore 60, conduit 68, valve 43, conduit 34 and valve 36, the latter being opened upon release of the accelerator. The piston 48 is thus forced to the right, to the position disclosed in Figure 4, by virtue of the evacuation of the right compartment of the motor and the pressure of the atmosphere acting on the left side of the piston. This piston movement also serves to compress spring 88 for a purpose to be described hereinafter.

The piston hub 50 during this movement abuts the shoulder of the rod 52 to thereby actuate the rod and its connected crank 56 to change the setting of the transmission 26. Preferably the above shift is effected while the car is free wheeling in conventional high gear, thereby stepping down the driving ratio between the engine and the rear wheels and permitting a very quick pick-up in traffic. In order to obtain this pick-up it is, of course, necessary to again depress the accelerator to engage the clutch and speed up the engine. Obviously, however, the driving ratio might be changed by the operation of the supplemental transmission in any one of the remaining gear settings of the conventional transmission 24.

The transmission control valve may, as disclosed in Figure 6, be actuated by the right foot of the driver, a three-way valve 106 being actuated upon depressing the right heel to bodily move the accelerator pedal 107 at its spring loaded fulcrum 108. Release of the right toe thus serves to close the throttle and declutch, and movement of the heel serves to operate the two-speed transmission.

Figure 2:
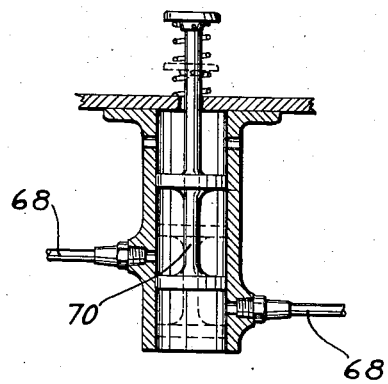
Figure 2 is a sectional view of the three-way control valve for the transmission operating servo motor.

Referring again to the valve 43 of Figures 1 and 2, the valve may now be closed by lifting the left toe to thereby actuate the piston hub and rod selector valve structure heretofore referred to and prepare the motor for its next gear shifting operation. This is accomplished by the return movement of the valve piston 70 to the full line position disclosed in Figure 2, thus venting the right compartment of the motor to atmosphere via the bores 60 and 86. The compressed spring 88 then expands to move the piston 48 to the left relative to the rod 52, to the position disclosed in Figure 5, venting the right compartment of the motor to atmosphere via bores 82 and 62 and placing the left compartment of the motor in communication with the valve 43 via bores 84 and 60.

The piston 48 and rod 52 together constitute the aforementioned selector valve. The valve is furthermore power operated by springs 88 and 90, and this power operation is controlled by the control valve 43, the latter thereby serving the dual function of a control valve for the motor and as a control valve for the power means for actuating the selector valve mechanism. It is also to be noted that the piston and connecting rod of the motor effect the dual function of serving as the reciprocating element of the motor in operating the supplemental transmission, and also serving as the selector valve mechanism.

Now when it is desired to step up the driving ratio, or rather return it to its original setting, the aforementioned cycle of operations is repeated, the piston 48 now moving to the left under the weight of the atmosphere acting on its right side. Upon closing or venting of the control valve 43 the selector valve mechanism is again power or spring operated to prepare for the subsequent gear shifting operation of the motor to follow.

It will be noted that the aforementioned motor may not be operated to actuate the transmission 26 until the three-way clutch control valve 36 is opened. Such structure thus insures a disengagement of the clutch prior to the power operation of the transmission 26, which is the end desired. It is also to be noted that the accelerator serves the threefold function of controlling the throttle, the clutch and the supplemental transmission.

If desired, the conduit 68 may, as disclosed in Figure 7, be connected directly to the manifold and the clutch operated manually in the usual fashion. With such a construction it is necessary to idle the engine to produce a vacuum in the manifold prior to the operation of the valve 43.

There is thus provided a very simple and compact power operated transmission operating mechanism including a power operated selector valve, said mechanism cooperating with a power operated clutch and providing, in conjunction with the conventional transmission, eight different driving ratios to thereby insure the much desired flexibility of control in the operation of the vehicle.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. An automotive power plant comprising a motor, throttle means for controlling the operation of said motor, throttle control means, a clutch, power means for operating the clutch, control means for said clutch operating means, a transmission mechanism, power means for operating said transmission, control means for said transmission operating means, the aforementioned control means for the throttle means, clutch and transmission having a manually operable element in common.

2. An automotive power plant comprising a motor, throttle means for controlling the operation of said motor, throttle control means, a clutch, power means for operating the clutch, control means for said clutch operating means, a transmission mechanism, power means for operating said transmission, control means for said transmission operating means, the aforementioned control means for the throttle means, clutch and transmission having a manually operable element in common, said control means for the transmission operating power means comprising a manually operable three-way valve operable in conjunction with said aforementioned manually operated common element to control the operation of the transmission operating power means.

3. An automotive power plant comprising, in combination, a motor, a clutch, power means for operating the clutch, control means for said clutch operating power means, a transmission, power means for operating the transmission, control means for said latter power means, said aforementioned control means for both clutch and transmission including a valve element in common, said valve being so constructed and arranged with respect to the remaining structure as to prevent the operation of the transmission operating means prior to the operation of the clutch operating means whereby the clutch is disengaged prior to the operation of the transmission.

4. An automotive power plant comprising, in combination, a motor having an intake manifold, a clutch, vacuum operated power means for operating the clutch, control means for said clutch operating power means, a transmission, vacuum operated power means for operating the transmission, control means for said latter power means, said vacuum operated power means being rendered operative by virtue of connections with the intake manifold, said aforementioned control means for both clutch and transmission including a valve element in common, said valve being so constructed and arranged with respect to the remaining structure as to prevent the operation of the transmission operating means prior to the operation of the clutch operating means whereby the clutch is disengaged prior to the operation of the transmission.

5. In a motor vehicle provided with an internal-combustion engine having an intake manifold and further provided with a transmission mechanism, a clutch and fluid power operated means for operating the clutch, a fluid pressure motor operably connected with said transmission mechanism, a fluid transmitting connection between said motor and manifold, a motor control valve interposed in said connection and valve means for controlling the operation of said clutch operating power means, said latter valve also being incorporated in said aforementioned fluid connections and serving, in conjunction with said first mentioned valve, to control the operation of the transmission operating fluid pressure motor.

6. Change-speed mechanism for an automotive vehicle comprising, in combination, a two-speed transmission and power means for operating said transmission mechanism to effect the two driving ratio settings of the transmission, said power means including a fluid operated motor, an operative connection between said motor and transmission, a control valve for said motor and valve means housed within said motor and constituting the aforementioned operative connection, said latter valve being actuated as a result of movement of said operative connection and functioning as a selector for determining the mode of operation of the motor in effecting the aforementioned selective operation of the transmission.

7. Change-speed mechanism for an automotive vehicle comprising, in combination, a two-speed transmission and power means for operating said transmission to effect the two driving ratio settings of the transmission, said power means including a fluid operated motor, an operative connection between said motor and transmission, a manually operated three-way control valve for said motor and valve means housed within said motor and constituting the movable part thereof, said latter valve being actuated as a result of movement of said operative connection and functioning as a selector for determining the mode of operation of the motor in effecting the aforementioned selective operation of the transmission.

8. Change-speed mechanism for an automotive vehicle comprising, in combination, a two-speed transmission and power means for operating said transmission to effect the two driving ratio settings of the transmission, said power means including a fluid operated motor, an operative connection between said motor and transmission, a manually operated three-way control valve for said motor and power operated valve means housed within said motor and constituting the aforementioned operative connection, said latter valve being actuated as a result of movement of said operative connection and functioning as a selector for determining the mode of operation of the motor in effecting the aforementioned selective operation of the transmission.

9. Change-speed mechanism for an automotive vehicle comprising, in combination, a two-speed transmission and power means for operating said transmission to effect the two driving ratio settings of the transmission, said power means including a fluid operated motor, an operative connection between said motor and transmission, a three-way control valve for said motor and power operated valve means housed within said motor and constituting the movable part thereof, said latter valve being actuated as a result of movement of said operative connection and functioning as a selector for determining the mode of operation of the motor in effecting the aforementioned selective operation of the transmission, the motor parts being so constructed that said motor control valve also functions as a control valve for the power means which operates said selector valve.

10. Change-speed mechanism for an automotive vehicle comprising, in combination, a two-speed transmission and power means for operating said transmission to effect the two driving ratio settings of the transmission, said power means including a fluid operated motor, an operative connection between said motor and transmission, a manually operated three-way control valve for said motor and power operated valve means housed within said motor and constituting the movable part thereof, said latter valve functioning as a selector for determining the mode of operation of the motor in effecting the aforementioned selective operation of the transmission, said motor control valve also functioning as a control valve for the power means which operates said selector valve, said power means comprising springs interposed between the ends of said motor and the aforementioned combined valve and movable motor part.

11. In combination with a prime mover, throttle controlling means therefor, a driven mechanism, change speed gearing between the prime mover and the driven mechanism, a pneumatic mechanism operably connected with the prime mover and adapted to shift the change speed gearing, and means connected with the throttle means for controlling the pneumatic mechanism.

12. The combination with a source of vacuum of a vacuum operated clutch, a vacuum operated gear shift, a fuel control element, and means whereby the availability of the vacuum to the gear shift is dependent upon the position of the fuel control element, and whereby the clutch position is determined by the application of vacuum to the clutch mechanism through the movement of the fuel control element.

13. In combination with an internal combustion engine having a throttle controlled intake manifold, an accelerator pedal operably connected with the throttle, a driven mechanism, a variable speed transmission interposed between the engine and the driven mechanism, a motor operably connected with the variable speed transmission and adapted to be energized by the vacuum existing in the intake manifold, and means operably associated with the accelerator pedal for controlling the energization of said motor.

14. In combination with an internal combustion engine having a throttle controlled intake manifold and a clutch, an accelerator pedal operably connected with the throttle, a driven mechanism, a variable speed transmission interposed between the engine and the driven mechanism, vacuum operated power means for disengaging the clutch, a motor operably connected with the variable speed transmission and adapted to be energized by the vacuum existing in the intake manifold, and means for controlling the energization of said power means and motor comprising a part operably associated with the accelerator pedal, said means being so constructed and arranged with respect to the remaining structure as to prevent the operation of the transmission operating motor prior to the operation of the clutch operating means whereby the clutch is disengaged prior to the operation of the transmission.

15. In combination with an internal combustion engine having an intake manifold, an accelerator pedal, a driven mechanism, a variable speed transmission interposed between the engine and the driven mechanism, a motor operably connected with the variable speed transmission and adapted to be energized by the vacuum existing in the intake manifold, and means including a valve operably associated with the accelerator pedal for controlling the energization of said motor.

16. In an automotive vehicle provided with an internal combustion engine having an intake manifold, a throttle and an accelerator for operating the throttle to thereby vary the gaseous pressure within the manifold, a driven mechanism, and selective gear transmission mechanism interposed between the engine and driven mechanism, a part of said transmission mechanism being manually operable to effect a plurality of forward speed settings and a reverse gear setting and a part of said transmission mechanism being power operated to effect one or the other of two forward speed settings, power means for effecting said latter operation comprising a remotely controlled motor operably connected to said transmission mechanism, air transmitting means interconnecting said motor and manifold, and means operably associated with the accelerator for in part controlling the operation of said motor, the latter being operative to alternately effect first one power operated setting of the transmission mechanism and then the other power operated setting of said mechanism with successive operations of the aforementioned motor controlling means.

17. In an automotive vehicle provided with an internal combustion engine having an intake manifold, a throttle and an accelerator for operating the throttle to thereby vary the gaseous pressure within the manifold, a driven mechanism, and selective gear transmission mechanism interposed between the engine and driven mechanism, a part of said transmission mechanism being manually operable to effect a plurality of forward speed settings and a reverse gear setting and a part of said transmission mechanism being power operated to effect one or the other of two forward speed settings, power means for effecting said latter operation comprising a remotely controlled motor unit operably connected to said transmission mechanism and serving to alternately effect first one power operated setting of said mechanism and then the other power operated setting thereof, air transmitting means interconnecting said motor and manifold, and means for controlling the operation of said motor comprising power operated valve means constituting a part of the motor unit and further comprising means operably associated with the accelerator and serving when operated to effect an operation of the aforementioned power operated valve means to thereby initiate an operation of the motor unit.

18. In an automotive vehicle provided with an internal combustion engine having an intake manifold, a throttle and an accelerator for operating the throttle to thereby vary the gaseous pressure within the manifold, a driven mechanism, and selective gear transmission mechanism interposed between the engine and driven mechanism, a part of said transmission mechanism being manually operable to effect a plurality of forward speed settings and a reverse gear setting and a part of said transmission mechanism being power operated to effect one or the other of two forward speed settings, power means for effecting said latter operation comprising a remotely controlled motor having a vacuum operated power element operably connected to the transmission mechanism, said motor serving to alternately effect first one power operated setting of said mechanism and then the other power operated setting thereof, air transmitting means interconnecting said motor and manifold, and means for controlling the operation of said motor comprising power operated valve means and further comprising a manually operated cut-in and cut-out means serving when operated to effect an operation of the aforementioned power operated valve means to thereby initiate an operation of the motor.

19. In an automotive vehicle provided with an internal combustion engine having an intake manifold and further provided with a selective gear transmission mechanism comprising a change-speed transmission mechanism which is manually operable to effect any one of three forward speed settings and a reverse gear setting and a power operated transmission mechanism to effect one or the other of two forward speed settings, power means for effecting the latter settings, said power means comprising a double-acting motor operably connected with said transmission mechanism, an air transmitting conduit interconnecting the manifold and motor, means for controlling the operation of said motor comprising two three-way valves, means for operating said valves comprising springs, and means for controlling the operation of said valves, said motor being operative to alternately effect the aforementioned power operated forward settings of the transmission mechanism.

20. In an automotive vehicle provided with an internal combustion engine having an intake manifold, an accelerator pedal and an accelerator operated throttle for in part controlling the degree of evacuation of the manifold, a selective gear transmission mechanism constituting a part of the power plant of the vehicle, said mechanism comprising a three-speeds forward and reverse mechanism and a two-speeds forward mechanism cooperating with said three-speeds forward and reverse mechanism, means for operating the three-speeds forward and reverse mechanism, power means for operating said two-speeds forward mechanism comprising a motor, air transmitting means interconnecting said motor and manifold, means for controlling the operation of said motor comprising a three-way valve and manually operated means for controlling the operation of said valve, said power means being so constructed and arranged as to effect first one setting of the two-speeds forward mechanism and then the other setting of said mechanism with each successive operation of the three-way valve.

VICTOR W. KLIESRATH.
ROY S. SANFORD.